US009514198B1

(12) United States Patent
Haugen et al.

(10) Patent No.: US 9,514,198 B1
(45) **Date of Patent: *Dec. 6, 2016**

(54) SUGGESTING A TAG TO PROMOTE A DISCUSSION TOPIC

(75) Inventors: Frances B. Haugen, Mountain View, CA (US); Daniel M. Crichton, Eden Prairie, MN (US)

(73) Assignee: Google Inc., Mountain View, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/604,857

(22) Filed: Sep. 6, 2012

Related U.S. Application Data

(60) Provisional application No. 61/531,188, filed on Sep. 6, 2011.

(51) Int. Cl.
*G06F 17/30* (2006.01)

(52) U.S. Cl.
CPC .............................. *G06F 17/30554* (2013.01)

(58) Field of Classification Search
CPC ................................................ G06F 17/30554
USPC .......................................................... 707/723
See application file for complete search history.

(56) References Cited

U.S. PATENT DOCUMENTS

| | | | | |
|---|---|---|---|---|
| 7,739,304 | B2 * | 6/2010 | Naaman | G06K 9/00677 707/767 |
| 7,844,668 | B2 | 11/2010 | Canning et al. | |
| 8,549,013 | B1 * | 10/2013 | Sarma et al. | 707/748 |
| 8,676,875 | B1 * | 3/2014 | Smith | H04L 51/32 705/37 |
| 8,676,913 | B1 | 3/2014 | Roche et al. | |
| 8,683,355 | B1 * | 3/2014 | Gailloux et al. | 715/758 |
| 8,793,285 | B2 | 7/2014 | Han | |
| 2008/0140699 | A1 * | 6/2008 | Jones et al. | 707/102 |
| 2009/0222551 | A1 * | 9/2009 | Neely et al. | 709/224 |
| 2010/0161620 | A1 * | 6/2010 | Lamere | G06F 17/30749 707/749 |
| 2010/0228777 | A1 | 9/2010 | Imig et al. | |
| 2011/0029533 | A1 * | 2/2011 | Jayakody | G06F 17/30997 707/738 |
| 2011/0314014 | A1 | 12/2011 | Junginger et al. | |
| 2012/0064499 | A1 * | 3/2012 | Samuelson et al. | 434/309 |
| 2012/0203832 | A1 * | 8/2012 | Vastardis et al. | 709/204 |
| 2012/0278748 | A1 * | 11/2012 | Pierre | G06Q 10/103 715/771 |

(Continued)

OTHER PUBLICATIONS

Office Action issued in U.S. Appl. No. 13/738,101 on Apr. 1, 2015, 12 pages.

(Continued)

*Primary Examiner* — Tarek Chbouki
(74) *Attorney, Agent, or Firm* — Fish & Richardson P.C.

(57) ABSTRACT

Example techniques for suggesting a tag to promote a discussion topic may include the following operations: receiving text into a display field; performing a search to identify a topic relating to the text, where the topic is among plural topics being discussed on a social networking service; identifying a title of a discussion on the social network service that relates to the identified topic; ranking the title among other titles of discussion topics based, at least in part, on a number of members of the social networking service that are participating in the discussion; and suggesting, based on the ranking, a text entry for the display field that promotes posting to the discussion identified by the title.

20 Claims, 10 Drawing Sheets

(56) References Cited

U.S. PATENT DOCUMENTS

| | | | |
|---|---|---|---|
| 2013/0055101 | A1 | 2/2013 | Sabur |
| 2013/0073547 | A1 | 3/2013 | Pereyra |
| 2013/0073686 | A1 | 3/2013 | Sandholm |
| 2013/0110827 | A1 | 5/2013 | Nabar et al. |
| 2013/0262588 | A1 | 10/2013 | Barak et al. |
| 2014/0040029 | A1 | 2/2014 | Vhora |
| 2014/0040370 | A1 | 2/2014 | Buhr |
| 2014/0181197 | A1 | 6/2014 | Baggott |
| 2015/0046418 | A1 | 2/2015 | Akbacak et al. |

OTHER PUBLICATIONS

Notice of Allowance in U.S. Appl. No. 13/738,101 on Nov. 6, 2015, 9 pages.

* cited by examiner

SUGGESTING A TAG TO PROMOTE A DISCUSSION TOPIC

CROSS-REFERENCE TO RELATED APPLICATION

Priority is hereby claimed to U.S. Provisional Application No. 61/531,188, which was filed on Sep. 6, 2011. The contents of U.S. Provisional Application No. 61/531,188 are hereby incorporated by reference into this disclosure.

BACKGROUND

This disclosure relates generally to promoting discussion topics.

Social networks permit users to post information about themselves and to communicate with other people, e.g., their friends, family, and co-workers. Some social networks permit users to specify friendships with other users.

Additionally, some social networks allow users to access, and post, content relating to discussion topics. Such content may be posted to a discussion forum, to a Web page, or to another place that is accessible to those on the social network. Discussion topics may be created by members of the social network, and made accessible through their profiles, posts, home pages, or the like. In some social networks, a discussion topic can be identified by a tag (e.g., a hash mark) followed by a title. The tag is typically a link to a Web page, forum, or other place where information about the discussion topic may be exchanged. The title of the tag is typically indicative of the subject of the discussion topic.

A social network may include numerous (e.g., tens, hundreds, or more) discussion topics that relate to the same subject, but that have differently titled tags. For instance, if the NY Yankees are playing in the World Series, there could be multiple, similar conversations around different tags.

SUMMARY

Example techniques for suggesting a tag to promote a discussion topic may include the following operations: receiving text into a display field; performing a search to identify a topic relating to the text, where the topic is among plural topics being discussed on a social networking service; identifying a title of a discussion on the social network service that relates to the identified topic; ranking the title among other titles of discussion topics based, at least in part, on a number of members of the social networking service that are participating in the discussion; and suggesting, based on the ranking, a text entry for the display field that promotes posting to the discussion identified by the title. The example techniques may include one or more of the following features, either alone or in combination.

The text may be preceded by a tag. The tag may be recognized and used to identify the topic or the title. The plural topics may have different levels of popularity on the social networking service. Ranking the title may include ranking titles of discussion topics that have less than a number of members as being more relevant than titles of discussion topics that have more than the number of members. Ranking the title may include ranking titles of discussion topics that have more than a number of members as being more relevant than titles of discussion topics that have less than the number of members.

Identifying the topic may include completing the text to produce a query term; and searching an index using the query term to identify the topic. Identifying the topic may include using the text to examine an index of the plural topics; and selecting, from the index, one or more of the plural topics that corresponds to the text.

The text may be first text, and the text entry may be displayed in another display area. Suggesting the text entry may include substituting second text for the first text, where the second text is for the topic, and where the second text and the first text have at least a character sequence in common.

The text may be first text, and the text entry may be displayed in another display area. Suggesting the text entry may include substituting second text for the first text, where the second text is for the topic, and where the second text and the first text have no character sequence in common.

Suggesting may include suggesting multiple possible text entries for the display field that relate to the topic. A value may be displayed that is indicative of a level of popularity in association with each of the multiple possible text entries.

Performing the search may include searching one or more social graphs to identify a social connection to the topic, and using the social connection to affect ranking of the title.

Advantages of the foregoing techniques may include providing members of a social network with titles of discussion topics that may be of interest based on their popularity or based on partial input text.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are technologies for suggesting a tag to promote a title of a discussion topic on a social networking service. The technologies may include receiving text (e.g., a tag) in a display field of a user interface generated by the social networking service, identifying a discussion topic on the social networking service related to the received text; suggesting text to match a title of the discussion topic, and displaying the suggested text. By providing the suggestion, the processes encourage users move to a common discussion. As a result, users with common interests can coalesce into smaller groups with more members.

In an example implementation, a user may conduct a search, e.g., on a Web site that includes a social networking service. In response to the search, the user is presented with a stream of posts and a display field, e.g., a "sharebox", that allows the user to perform a search of discussion topics or to contribute to an ongoing conversation. In this example, the user begins, but need not complete, entering text into the sharebox. The text can be used to identify a discussion topic. In response to the entry, the system attempts to automatically fill-in the text entry by suggesting titles of possible discussion topics, e.g., in the form of tags, that correspond to the text entry. The possible tags may be presented as selectable entries adjacent to (e.g., underneath) the original entry. The system need not suggest possible tags based on their spelling alone, but rather the suggestion is performed in an attempt to compress multiple conversations into fewer discussion topics. For example, a text entry of #ya might lead the system to suggest #nyyankees (instead of #yankees) because the system is aware that the #nyyankees tag has more activity than the #yankees tag. The user is not required to accept suggestions by the system. The tags are merely suggested in order to direct the user, e.g., to more crowded, and thus more useful, topics.

Other types of automatic suggestions also may be implemented by the system. For example, as noted above, a user may contribute to an ongoing conversation by entering a post into the conversation using a display field, e.g., the sharebox. The system may suggest tag(s) for the post. For example, the system may suggest a tag based on the content of the post itself, or based on the system-wide popularity of certain tags. In the former case, the system may examine the content of the post and suggest a new tag based on that content. In the latter case, the system may examine tags used in the system, and suggest the most popular tag, for example.

The techniques described above may be implemented in an appropriate network environment, with appropriate devices and computing equipment. An example of such an environment is described below.

Figure 1:
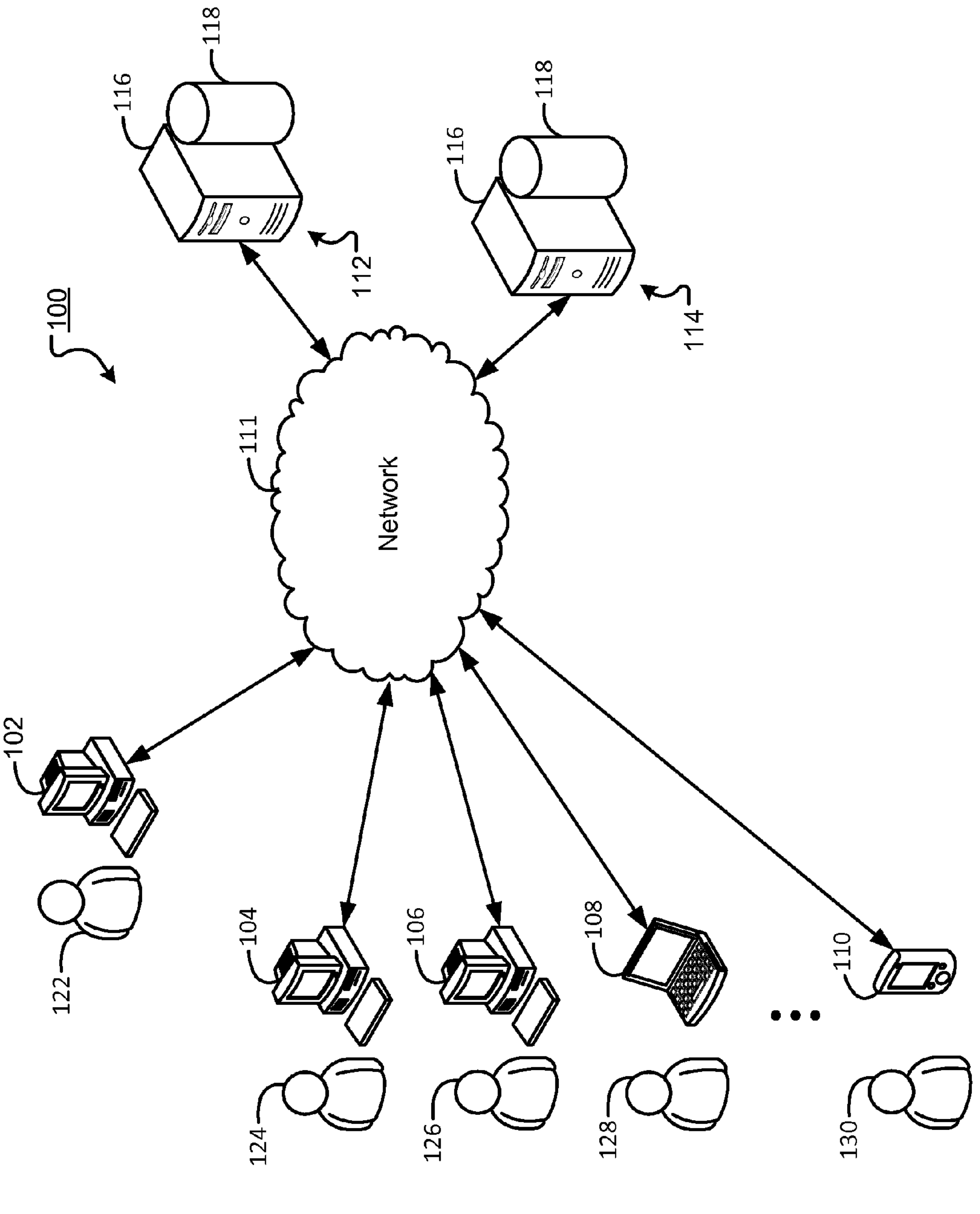
FIG. 1 is a block diagram showing an example of network environment on which the process described herein for suggesting a tag to promote a discussion topic may be implemented.

FIG. 1 is a block diagram showing an example of network environment on which the process described herein for suggesting a tag to promote a discussion title may be implemented. FIG. 1 shows an example network environment 100. The network environment 100 includes computing devices 102, 104, 106, 108, 110 that can each communicate with a first server system 112 and/or a second server system 114 over a network 111. Each of computing devices 102, 104, 106, 108, 110 has a respective user 122, 124, 126, 128, 130 associated therewith. Each of the first and second server systems 112, 114 includes a computing device 116 and a machine-readable repository, or database 118. Example environment 100 may include many thousands of Web sites, computing devices and servers, which are not shown.

The network 111 can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 102 to 110 enable respective users 122 to 130 to access and to view documents, e.g., Web pages included in Web sites. For example, user 122 of computing device 102 can view a Web page using a Web browser. The Web page can be provided to computing device(s) 102 to 110 by server system 112, server system 114 or another server system (not shown). In example environment 100, computing devices 102, 104, 106 are illustrated as desktop-type computing devices, computing device 108 is illustrated as a laptop-type computing device 108, and computing device 110 is illustrated as a mobile computing device. It is appreciated, however, that computing devices 102 to 110 can each include computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 2:
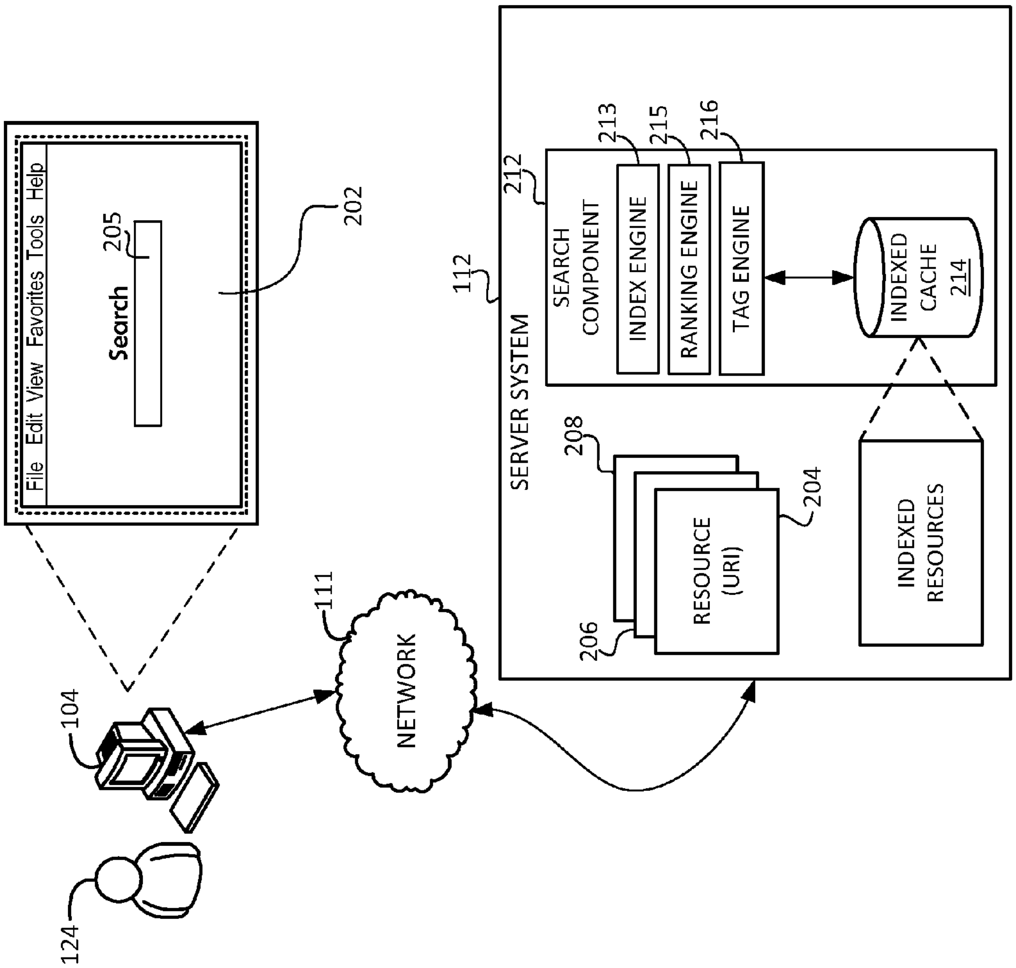
FIG. 2 is a block diagram of an example of part of the network environment of FIG. 1.

FIG. 2 is a block diagram of an example of part of the network environment of FIG. 1. FIG. 2 shows a portion 200 of example network environment 100. In FIG. 2, computing device 104 communicates with server system 112 to display a Web page 202 for a social networking service. In this example, server system 112 stores a plurality of resources 204, 206, 208, each having an associated resource identifier (Resource ID). Resources 204, 206, 208 correspond to different content available from the social networking service.

To view a Web page, user 124 can input or select a Resource ID using a browser that is executed on computing device 104. The Resource ID can include, for example, a uniform resource indicator (URI) or a uniform resource locator (URL). A request including the Resource ID is transmitted from computing device 104 to server system 112 over network 111. In response, the server system identifies the requested resource based on the Resource ID, and transmits the resource to computing device 104 over network 111. For example, the resource may be a Web page, through which a user may access content of a social networking service. The Web page may include, for example, fields for inputting user account information, e.g., a username and password.

The social networking service may include a search component 212 that identifies resources in the social networking site, and that crawls and indexes those resources. In some implementations, the search component is separate from the social networking service but can be used to search the service. In this regard, the search component may include an index engine 213 that indexes resources of the social networking service, e.g., discussion topics, tags, user profiles, content forums, content posts, and the like. An indexed cache 214 stores the index information, and a ranking engine 215 (or other software) ranks the resources based on criteria, e.g., popularity. The search may be implemented, e.g., on server system 112 as shown or on other appropriate hardware. In response to an input, the search component can access indexed cache 214 to identify resources that are relevant to the input. Ranking engine 215 ranks the identified resources based, e.g., on popularity or other appropriate criteria.

Figure 3:
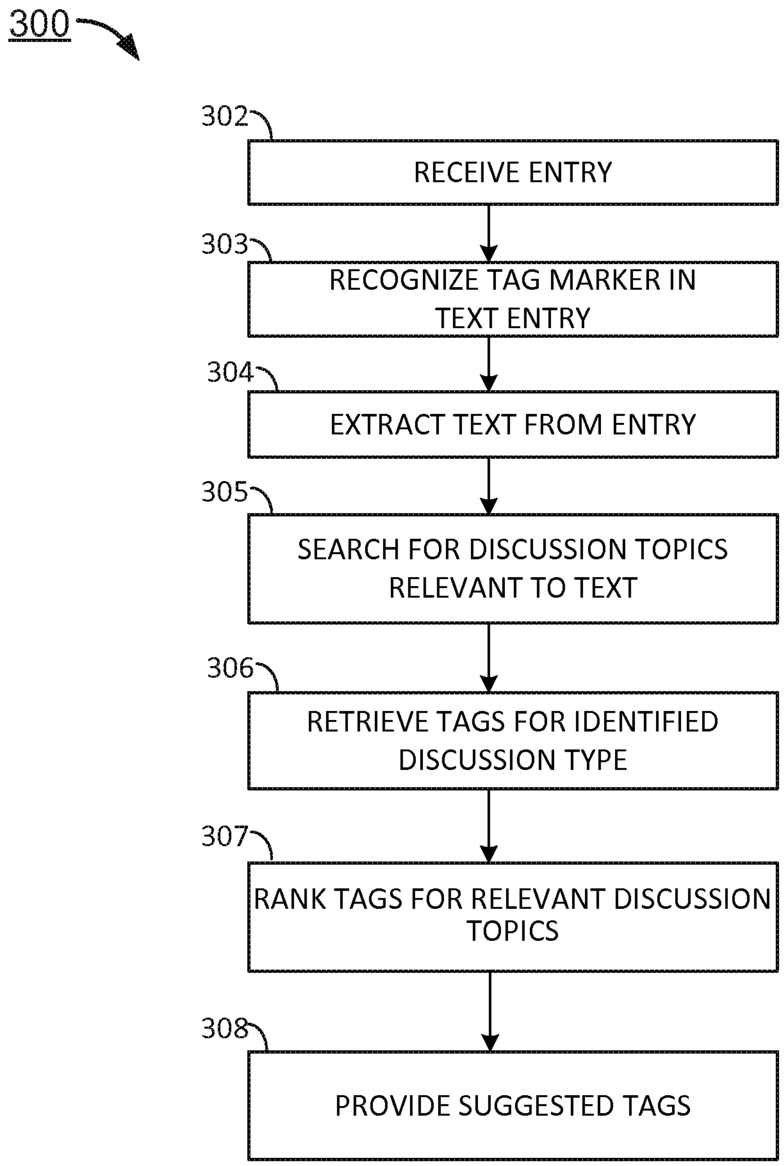
FIG. 3 is a flowchart of an example of a process for suggesting, during tag entry, one or more complete tags in order to promote a discussion topic.

FIG. 3 is a flowchart of an example of a process for suggesting, during tag entry, one or more complete tags in order to promote a discussion title. In this regard, FIG. 3 shows a process 300 for suggesting, as a tag is being entered, one or more complete tags in order to promote a discussion title. Process 300 may be performed by a dedicated tag engine 216, either alone or in conjunction with ranking engine 215, in the search component 212 of server system 112 or on other appropriate hardware.

Figure 4:
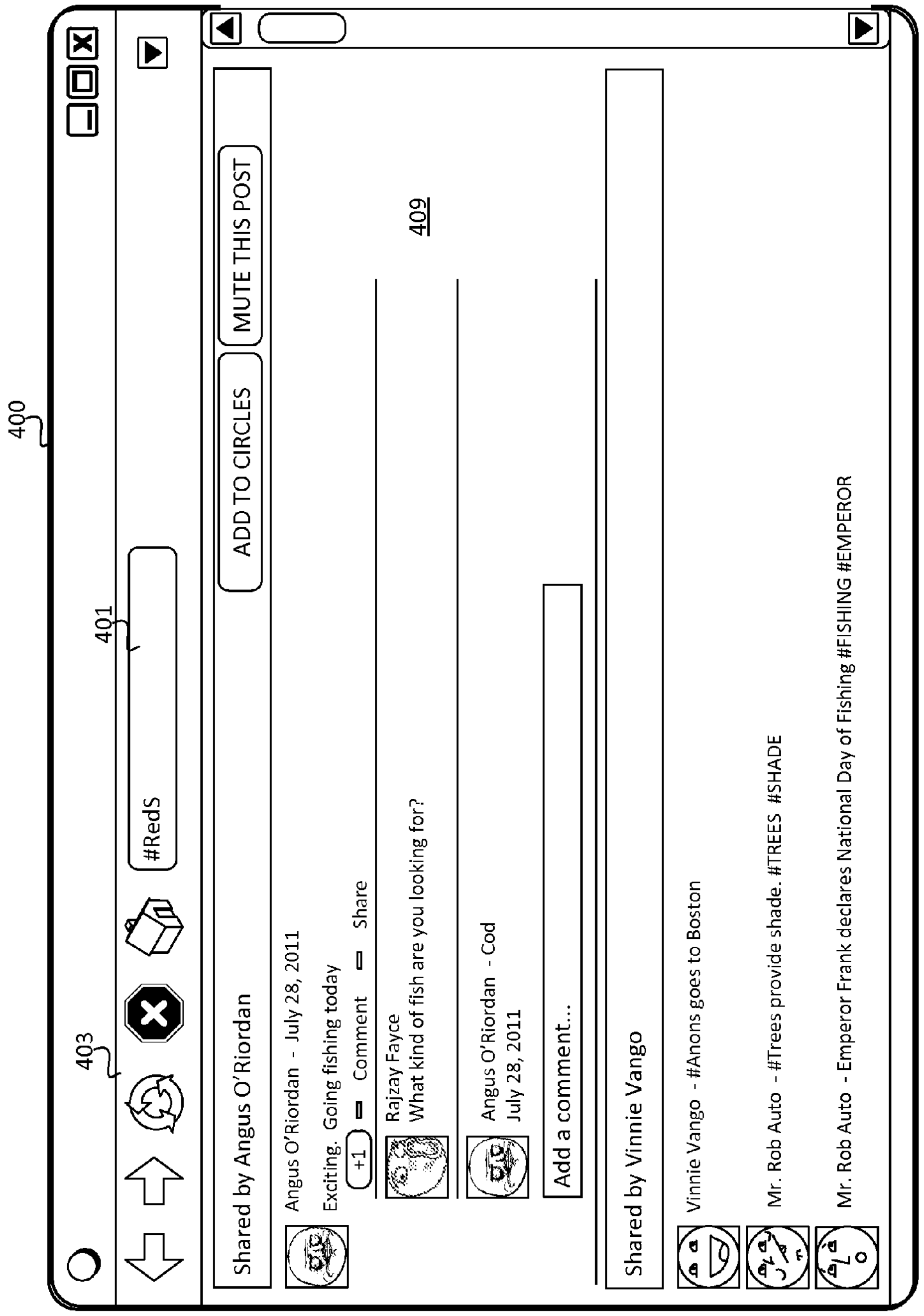
FIG. 4 is an example of a Web site for a social networking service, which includes a sharebox and a content stream.

Referring first to FIG. 4, a Web page 400 may contain a display field (sharebox 401), through which a user may search, post, or perform other operations in the social networking service. Controls 403, for example, dictate the operation that is to be performed on the information contained in sharebox 401. Content that is relevant to the search is displayed in a content stream 409. The content stream may include appropriate content, e.g., text, video, images, and links. The content stream may be updated, either automatically or in response to user input, e.g., a refresh or an additional search.

In this example, Web page 400 is accessed to access (e.g., to post to) a discussion topic. In this regard, the examples described herein relate to posting to discussion topics; however, the processes may be used for other types of discussion topic access. The discussion topic may be a forum that is on another Web page maintained by the social networking service. The discussion topic is identified by a tag. In this example, a tag is a hyperlink to the discussion topic, and contains a marker, here a "#" sign, although appropriate marker may be used. The title of the tag follows the marker, and is generally descriptive of the discussion topic. So, for example, a tag, e.g., #RedSox, may link to a discussion topic about the Red Sox.

Referring back to FIG. 3, process 300 receives (302) an entry in sharebox 401. In this example, the entry is a tag that includes a tag marker, e.g., a "#". The tag may be entered at the beginning or end of an associated text input, so the tag marker may be the first thing in the sharebox or it may come after other text in the sharebox. In this example implementation, process 300 recognizes (303) this tag marker in the sharebox. In response to recognition of the tag marker, process 300 may begin operations to suggest tags for the associated text input. This process is explained with respect to FIGS. 5 and 6.

In this regard, in other implementations, the operations to suggest tags for associated text input may not be triggered in response to a tag marker. For example, text input may trigger these operations. Accordingly, the tag marker is just way for the system to identify the user input as being directed to a (conversation) topic.

Figure 5:
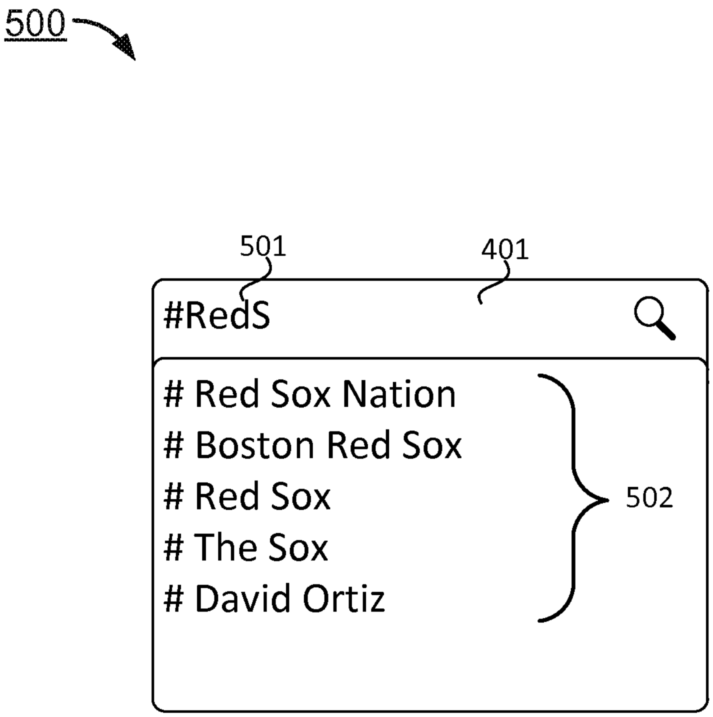
FIGS. 5 and 6 show examples of displays of suggested tags.
Figure 6:
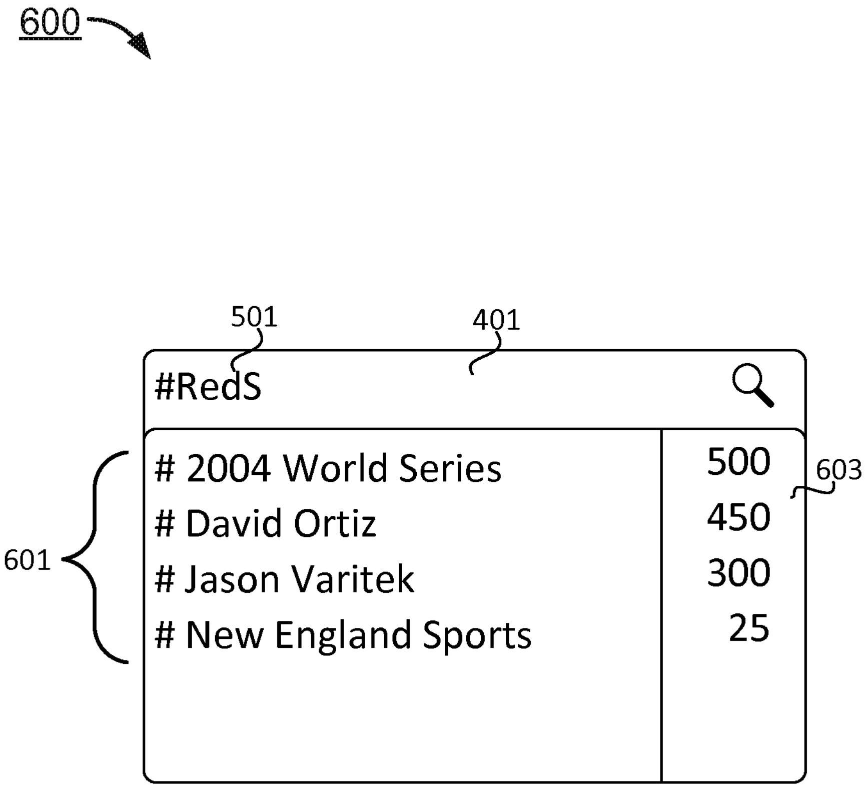

FIGS. 5 and 6 show suggestions made for a tag after four characters have been entered following a tag marker (in this example, #RedS). It is notable that the operations to suggest tags for an associated text input do not require entry of a number of characters following the tag marker. In some implementations, for example, these operations begin immediately upon recognition of a tag marker. For example, without further information, the system may begin to immediately suggest the most popular system-wide tags, and then refine the suggestions through process 300 as additional characters are added to the tag.

Referring to FIG. 5, the beginnings 501 of a tag are entered into sharebox 401. The tag being entered is #RedSox; however, process 300 only sees #RedS, since that is all that has been entered. At this point, process 300 extracts (304) text from the entry. Process 300 performs a search to identify (305) discussion topics that may be relevant to the text. This may involve automatically completing the text of the entry according to known methods. For example, process 300 may search an index of prior entries to determine that the most likely completion for "RedS" is "RedSox", e.g., where capitalization has meaning. A different result may occur as more characters are entered; however, for the purposes of this example, it is assumed that the most likely completion is "RedSox".

Process 300 uses "RedSox" as a query term to search (305) indexed cache 214. In this example, process 300 searches indexed cache 214 for discussion topics relating to the Red Sox. Process 300 may search the index by topic and/or by tag. For example, indexed tags may be searched to identify tags containing the phrase "RedSox" or a character sequence included in the phrase "RedSox". Likewise, discussion forum posts relating to the Red Sox, but whose tags do not include the phrase "RedSox" or some variation thereof, may also be searched. The searching performed may therefore identify discussion forums with tags that contain the phrase "RedSox" or some variation thereof, and discussion topics with tags that do not contain the phrase "RedSox".

In some implementations, process 300 may search the index to identify content of conversations in a discussion forum, participants in those discussions, and other appropriate information to identify discussion topics related to the Red Sox. In some implementations, process 300 may search a user's social graph to identify social connections to participants in identified discussion forums, or participants having shared interests with the searcher. Such information may be used in ranking discussion topic titles prior to output to the searcher.

Process 300 retrieves (306), from the index, tags for the identified discussion topics relating to the Red Sox. Process 300 ranks (307) the retrieved tags. The tags may be ranked to promote one or more of the discussion topics. In other words, the tags may be ranked to encourage a user to access, e.g., post their content to, and become an active member of, a particular discussion topic, for example. The tags may be ranked according to appropriate criteria. For example, the retrieved tags may be ranked according to the number of times a tag is used (with the most used tags being ranked first and others following in descending order), which discussion topic is most popular, which discussion topic includes the most members, which discussion topic is the oldest, which discussion topic needs additional members (e.g., in an attempt to populate one or more preferred discussion topic that do not currently have enough members), and so forth.

Process 300 provides (308) the ranked tags as suggestions to incorporate into sharebox 401. The suggestions may build on text already contained in the sharebox, or replace all or part of the text in the sharebox. The suggestions may be provided in an appropriate location relative to the sharebox. For example, the suggestions may be provided adjacent to the sharebox (e.g., underneath the sharebox) or in a pop-up window. FIGS. 5 and 6 show different tag suggestions that may be provided for the same text, here "RedS". In the example of FIG. 5, the tags 502 may represent, in descending order, discussion topics that have the most members and, therefore, that the system would like the user to participate in. The user may select examples of these tags 502, e.g., by touching or pointing and clicking. The selected tag may populate sharebox 401. As a result, a text input associated with that tag will be posted to the discussion topic associated with the tag.

In FIG. 5, it is notable that the automatic completion #RedSox is not ranked first among the suggested tags (#RedSoxNation is ranked first). For example, the #RedSoxNation topic may have more posts than the #RedSox topic and, consequently, the #RedSoxNation topic is suggested over the #RedSox topic.

FIG. 6 shows an example of a display of suggested tags. Specifically, FIG. 6 shows suggested tags 601. These tags may be suggested based on ranking criteria that is different from that used to produce the suggestions shown in FIG. 5. Alternatively, the tags suggested in FIG. 6 may be based on the same ranking criteria that are used to produce the suggestions shown in FIG. 5, but the results of FIG. 6 are shown for a different time. For the purposes of this example, the same ranking criteria (e.g., number of posts of a tag) are used in both FIGS. 5 and 6, but the suggested tags are different because the number of posts is different at different times. So, in the case of FIG. 6, the tags that are suggested are different from those suggested in FIG. 5. It is noted that the tags 601 in FIG. 6 do not contain a sequence of characters in common with the entered text 501. In the case of FIG. 5, by contrast, at least some of the suggestions contain a sequence of characters in common with the entered text 501, e.g., "RedSoxNation" contains the sequence "RedS". In some cases (not shown), all of the suggested tags may have a character sequence in common with the entered text. Results will vary over time based, e.g., on topic popularity.

The example of FIG. 6 also includes a display area 603 showing a number of posts for each suggested tag. For example, #2004WorldSeries has 500 posts; #DavidOrtiz has 450 posts, and so forth. Other appropriate indicia of popularity may be displayed instead of, or in addition to, the number of posts.

Figure 7:
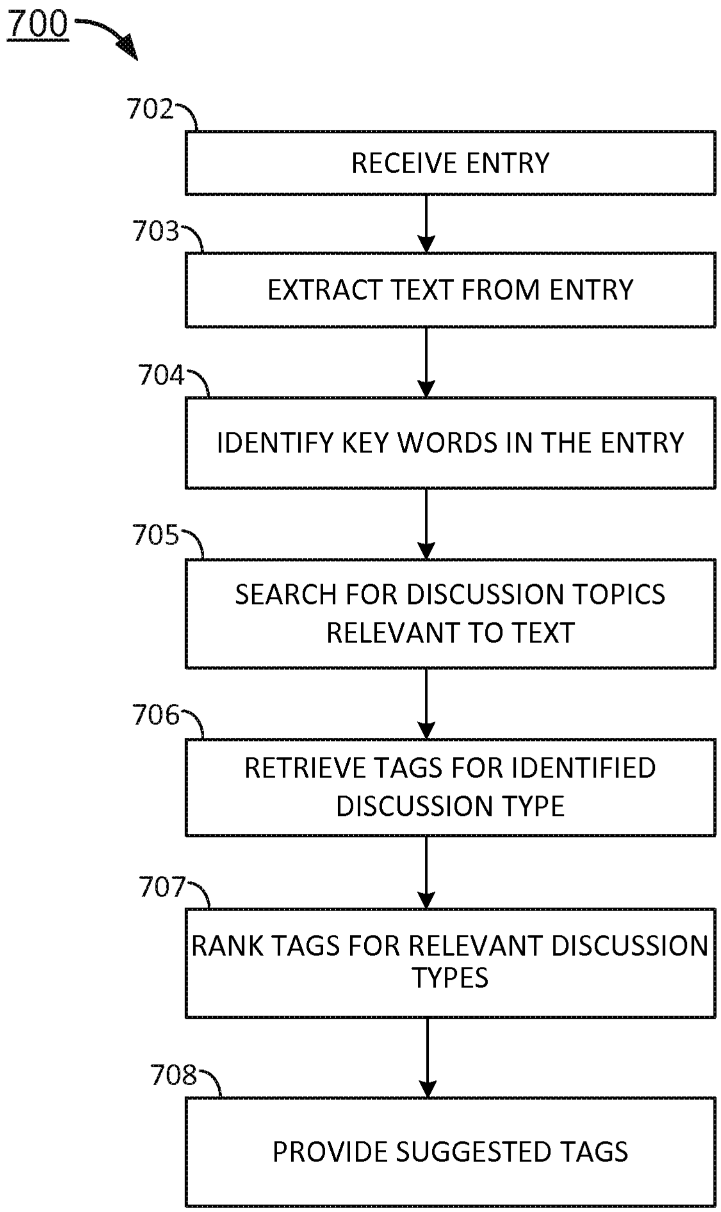
FIG. 7 is a flowchart of an example of a process for suggesting a tag to add to a post when no tag is being/has been entered.

FIG. 7 is a flowchart of an example of a process for suggesting a tag to add to a post when no tag is being/has been entered. In this regard, FIG. 7 shows process 700 for suggesting a tag to promote a discussion topic. Process 700 is different from process 300 at least because process 700 adds a tag to a post in cases where no tag is being/has been entered. Process 700 may be performed by a dedicated tag engine 216 in the search component 212 of server system 112 or on other appropriate hardware.

Process 700 receives (702) an entry in sharebox 401 of a Web page (e.g., the Web page of FIG. 4), along with an indication that "post" (or, e.g., another type of access control) has been selected. In this regard, controls on the Web page include a post function, which may be selected to add a post to a discussion topic through the sharebox. The entry is therefore to be posted to a discussion topic on the social networking service. An example of such a post is 801 shown in FIG. 8, which reads as follows: The Boston Red Sox Are Having A Great Season This Year. The post does not contain a tag marker; accordingly, no tag marker can be recognized by process 700. Process 700 performs the following operations to suggest tag markers to incorporate into the post.

Process 700 extracts (703) relevant text from the entry (e.g., post 801), and identifies (704) one or more key words in the entry that correspond to the subject of the text entry. For example, process 700 may disregard prepositions, and other words (e.g., stop words) in the text entry. Using, e.g., natural language analysis techniques, process 700 may identify what appear to be key words in the entry that reflect the subject of the entry. In this example, those key words are "Red Sox". Process 700 uses the identified key words ("Red Sox") to search (705) for discussion topics that may be relevant to the text entry. This operation (705), and the operations 705 to 708 that follow, may be similar to corresponding operations 305 to 308 of process 300 (FIG. 3).

Figure 8:
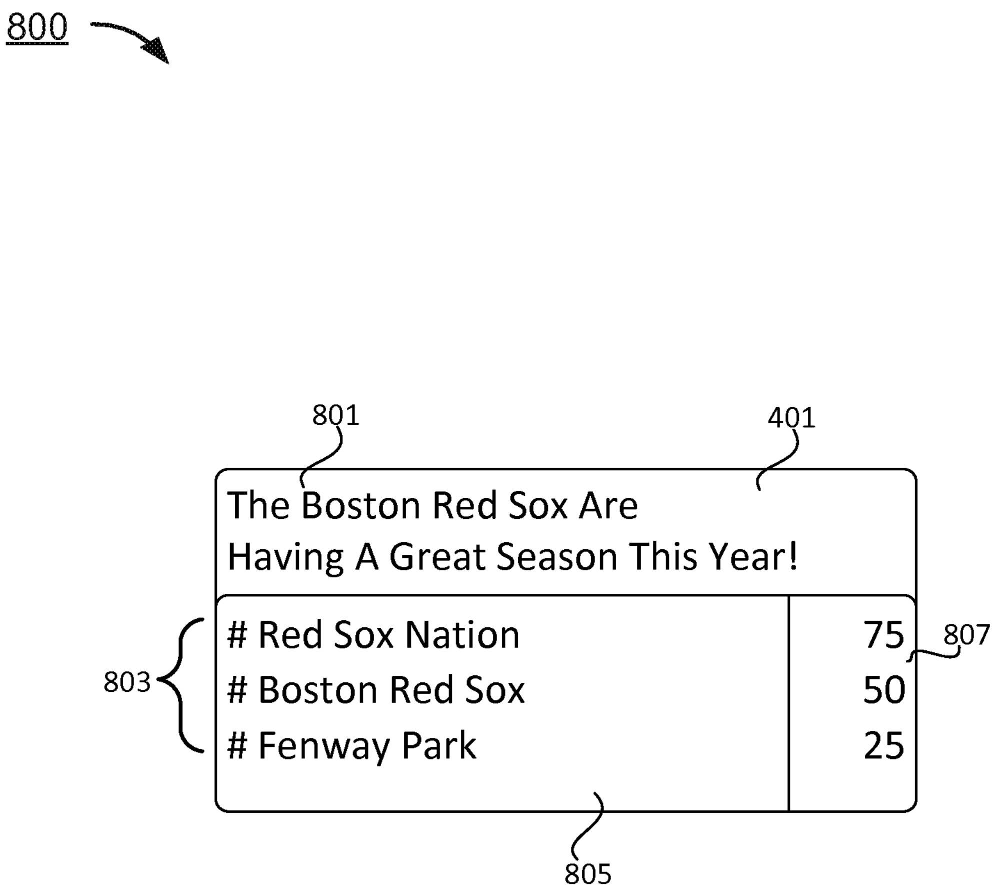
FIG. 8 is an example of a post and suggested tags therefor.

FIG. 8 is an example of a post and suggested tags therefor. Specifically, FIG. 8 shows an example forum post 801 in sharebox 401, and suggested tags 803 for that forum post. The suggested tags are displayed in an area 805 underneath sharebox 401. The example of FIG. 8 also includes an optional display area 807 showing a number of posts for each suggested tag. Other appropriate indicia of popularity may be displayed instead of, or in addition to, the number of posts.

In some implementations of process 700, the ranked tag that is at the top of the suggested list (e.g., the ranked tag that corresponds to a discussion topic having the most participants) may be automatically incorporated into sharebox 401. The user may be provided an option (e.g., a pop-up option) to accept that tag or to reject it. If rejected, the tag is removed from the sharebox.

Figure 9:
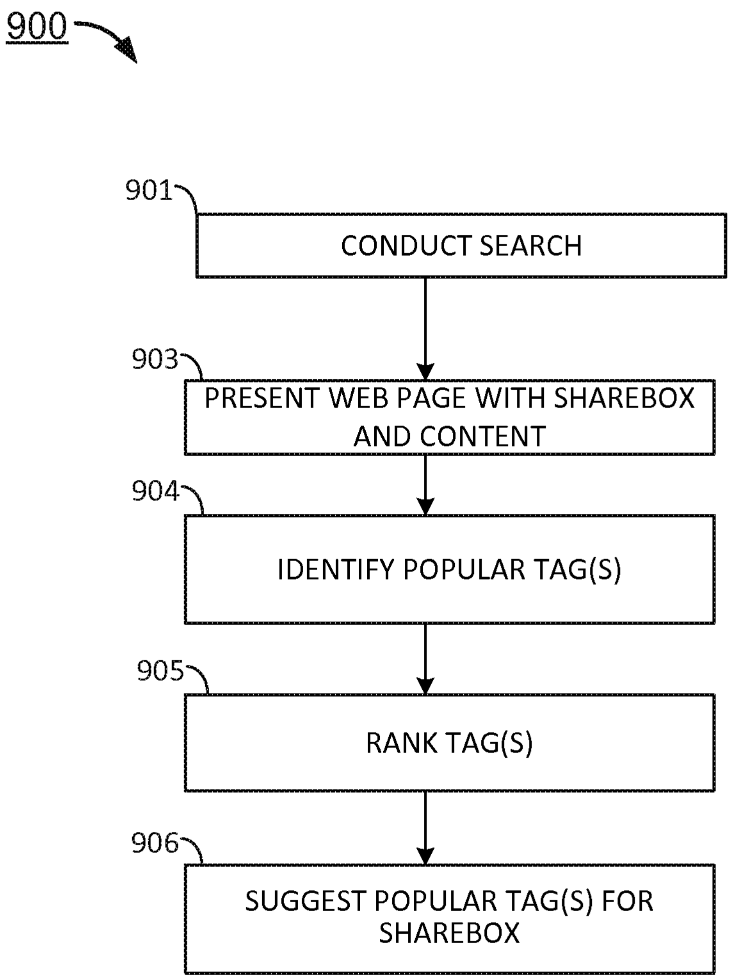
FIG. 9 is a flowchart of an example of process for suggesting a tag, based on popularity, to promote a discussion topic.

FIG. 9 is a flowchart of an example of process 900 for suggesting a tag, based on popularity, to promote a discussion topic. In this regard, FIG. 9 shows a process 900 for suggesting a tag to promote a discussion topic. In this regard, process 900 suggests tags, following a search, based on their popularity. Process 900 may be performed by a dedicated engine 216 in the search component 212 of server system 112 or on other appropriate hardware.

Process 900 conducts (901) a search of the social networking service in response to a search query term entered by a user. The search may be conducted of public content and private content, where owners of that private content have granted access permission. In this regard, owners of private content may be given the option to decide not to make their content accessible for searching. The search may be of discussion topics, user profiles, content posts, and other appropriate content found in the corpus of the social networking service. An example of search results displayed as a content stream is shown in FIG. 4. The content stream may include informational material, selectable links, images, video, and other appropriate content.

A user may select (e.g., click-on, touch, etc.) sharebox 401 to enter information, e.g., post content, in the social networking service. In response to a selection of the sharebox. The selection need not include information and need not be an actual mouse click or touch. Simply placing a cursor within the sharebox such that the text can be entered from that location will cause the signal to be sent. Entry and recognition of a tag marker may also trigger the process.

Process 900 receives (903) this signal and, in response, performs the following operations.

In some implementations, process 900 identifies (904) popular tags used in the social networking service. For example, process 900 may examine a database (e.g., associated with indexed cache 214) to identify which tags are currently (as defined by a specified time frame) most popular in the social networking service. In some implementations, an owner or creator of such tags may decide to/no to have those tags included, e.g., crawled and indexed, in which case such tags are not accessible in operation 904. The number of tags identified may be limited to a number that is set by the system or by the user. In some implementations, process 900 may identify a subset of popular tags in the social networking service. For example, process 900 may identify (904) all or some tags in the search results content. For cases where only some tags from the content stream are identified, those tags may be selected based, e.g., on their location within the content stream, their relevance to the original search query, or other appropriate selection criteria. Again, the number of tags identified may be limited to a number that is set by the system or by the user.

Process 900 ranks (905) the identified tags according to one or more criteria, e.g., those described above to promote a topic. For example, process 900 may rank the identified tags according to their popularity, which may be defined by the number of times those tags are used within the social networking service.

Process 900 suggests (906) the ranked tags in a similar manner as that described above in processes 300 and 700. As was also the case above, an optional display area may be included showing a number of posts for each suggested tag.

Figure 10:
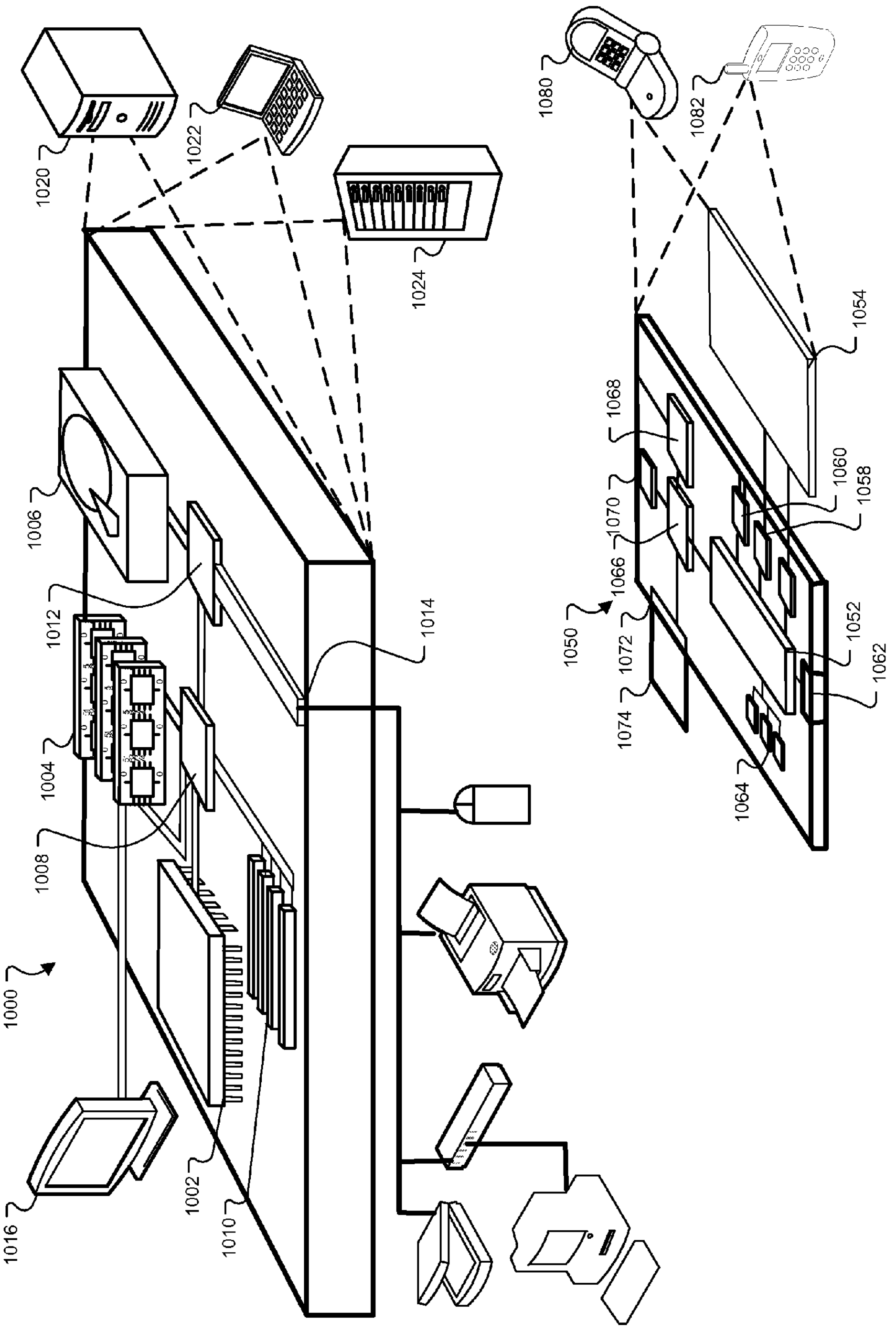
FIG. 10 shows examples of computing devices on which the processes described herein, or portions thereof, may be implemented.

FIG. 10 shows examples of computing devices on which the processes described herein, or portions thereof, may be implemented. In this regard, FIG. 10 shows an example of a generic computing device 1000 and a generic mobile computing device 1050, which may be used to implement the processes described herein, or portions thereof. For example, search component 212 may be implemented on computing device 1000. Mobile computing device 1050 may represent a client device of FIG. 1. Other client devices of FIG. 1 may also have the architecture of computing device 1000.

Computing device 1000 is intended to represent various forms of digital computers, examples of which include laptops, desktops, workstations, personal digital assistants, servers, blade servers, mainframes, and other appropriate computers. Computing device 1050 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, for example, display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, examples of which include a magnetic or optical disk.

The storage device 1006 is capable of providing mass storage for the computing device 1000. In one implementation, the storage device 1006 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 1004, the storage device 1006, or memory on processor 1002. For example, the information carrier may be a non-transitory, machine-readable storage medium.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer, e.g., a laptop computer 1022. Alternatively, components from computing device 1000 may be combined with other components in a mobile device (not shown), e.g., device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device, e.g. a display 1054, a communication interface 1066, and a transceiver 1068, among other components. The device 1050 may also be provided with a storage device, e.g., a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, e.g., control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, e.g., using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, e.g., through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems and techniques discussed herein collect personal information about users, the users may be provided with an opportunity to decide to/not to enable programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before recommending a connection to that user through the social networking account. Likewise, the processes may be programmed to confirm that information about a party is publicly known before divulging that information to other party, or even before incorporating that information into a social graph.

In the context of this disclosure, the terms social network and social networking service may be used interchangeably.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Other implementations not specifically described herein are also within the scope of the following claims.

What is claimed is:

1. A method comprising:

receiving text into a first display field;

performing a search of a search index to identify a topic relating to the text, the topic being among plural topics being discussed on a social networking service;

identifying discussions on the social network service that relate to the topic;

retrieving, from the search index, tags for the discussions that relate to the topic;

ranking the tags for the discussions that relate to the topic based, at least in part, on popularity of the discussions on the social networking service, a popularity of a discussion is based, at least in part, on an amount of participation in the discussion;

suggesting, to a user in an interface, in an order and based on the ranking, ranked tags for the first display field that promote posting to the discussions identified by the tags, with a first tag among the ranked tags relating to a first discussion topic having a first amount of participation, a second tag among the ranked tags relating to a second discussion topic having a second amount of participation, the first tag being ranked higher, relative to a ranking of the second tag, based on the first amount exceeding the second amount, wherein suggesting comprises:

selecting the first, higher ranked tag from among the ranked tags in the interface; and automatically incorporating the first, higher ranked tag into the first display field; and enabling, through the interface, the user to accept or reject the first, higher ranked tag that was automatically incorporated into the first display field, wherein, if the user rejects the first, higher ranked tag, the first, higher ranked tag is removed from the first display field.

2. The method of claim 1, wherein the text is preceded by a tag marker;

wherein the method further comprises recognizing the tag marker; and wherein the tag marker is used to identify the topic.

3. The method of claim 1, wherein the plural topics have different levels of popularity on the social networking service; and wherein ranking comprises ranking tags of discussion topics that have more than a number of members as being more relevant than tags of discussion topics that have more than the number of members.

4. The method of claim 1, wherein identifying the topic comprises:

completing the text to produce a query term; and searching the search index using the query term to identify the topic.

5. The method of claim 1, wherein identifying the topic comprises:

using the text to examine the search index for the plural topics; and selecting, from the search index, one or more of the plural topics that corresponds to the text.

6. The method of claim 1, wherein the tags are displayed in a second display field; and wherein suggesting the ranked tags comprises:

substituting the first tag for the text in the first display field, the first tag being for the topic, the first tag and the text having at least a character sequence in common.

7. The method of claim 1, wherein tags are displayed in a second display field; and wherein suggesting the ranked tags comprises:

substituting the first tag for the text in the first display field, the first tag being for the topic, the first tag and the text having no character sequence in common.

8. The method of claim 1, wherein suggesting comprises suggesting multiple possible tags for the first display field that relate to the topic; and wherein the method further comprises displaying a value indicative of a level of popularity in association with each of the multiple possible tags.

9. The method of claim 1, wherein performing the search comprises searching one or more social graphs to identify a social connection to the topic, and using the social connection to affect ranking of the tags.

10. The method of claim 1, wherein the text comprises a post to the social networking service.

11. The method of claim 1, wherein the text comprises a search query term.

12. One or more non-transitory machine-readable media storing instructions that are executable to perform operations comprising:

receiving text into a first display field;

performing a search of a search index to identify a topic relating to the text, the topic being among plural topics being discussed on a social networking service;

identifying discussions on the social network service that relate to the topic;

retrieving, from the search index, tags for the discussions that relate to the topic;

ranking the tags for the discussions that relate to the topic based, at least in part, on popularity of the discussions on the social networking service, a popularity of a discussion is based, at least in part, on an amount of participation in the discussion;

suggesting, to a user in an interface, in an order and based on the ranking, ranked tags for the first display field that promote posting to the discussions identified by the tags, with a first tag among the ranked tags relating to a first discussion topic having a first amount of participation, a second tag among the ranked tags relating to a second discussion topic having a second amount of participation, the first tag being ranked higher, relative to a ranking of the second tag, based on the first amount exceeding the second amount, wherein suggesting comprises:

selecting the first, higher ranked tag from among the ranked tags in the interface; and automatically incorporating the first, higher ranked tag into the first display field; and enabling, through the interface, the user to accept or reject the first, higher ranked tag that was automatically incorporated into the first display field, wherein, if the user rejects the first, higher ranked tag, the first, higher ranked tag is removed from the first display field.

13. The one or more non-transitory machine-readable media of claim 12, wherein the tags are displayed in a second display field; and wherein suggesting the ranked tags comprises:

substituting the first tag for the text in the first display field.

14. The one or more non-transitory machine-readable media of claim 12, wherein performing the search comprises searching one or more social graphs to identify a social connection to the topic, and using the social connection to affect ranking of the tags.

15. The one or more non-transitory machine-readable media of claim 12, wherein the plural topics have different levels of popularity on the social networking service; and wherein ranking comprises ranking tags of discussion topics that have more than a number of members as being more relevant than tags of discussion topics that have less than the number of members.

16. A system comprising:

memory storing instructions that are executable, and one or more processing devices to execute the instructions to implement elements comprising:

an indexing engine to generate a search index; and a data engine to use the search index to identify a topic relating to text, the data engine comprising instructions that are executable to perform operations comprising:

receiving the text into a first display field;

performing a search of the search index to identify a topic relating to the text, the topic being among plural topics being discussed on a social networking service;

identifying discussions on the social network service, the discussions relating to the topic;

retrieving, from the search index, the tags for discussions that relate to the topic;

ranking the tags for the discussions that relate to the topic based, at least in part, on popularity of the discussions on the social networking service, a popularity of a discussion is based, at least in part, on an amount of participation in the discussion;

suggesting, to a user in an interface, in an order and based on the ranking, ranked tags for the first display field that promote posting to the discussions identified by the tags, with a first tag among the ranked tags relating to a first discussion topic having a first amount of participation, a second tag among the ranked tags relating to a second discussion topic having a second amount of participation, the first tag ranked higher, relative to a ranking of the second tag, based on the first amount exceeding the second amount, wherein suggesting comprises:

selecting the first, higher ranked tag from among the ranked tags in the interface; and automatically incorporating the first, higher ranked tag into the first display field; and enabling, through the interface, the user to accept or reject the first, higher ranked tag that was automatically incorporated into the first display field, wherein, if the user rejects the first, higher ranked tag, the first, higher ranked tag is removed from the first display field.

17. The system of claim 16, wherein the plural topics have different levels of popularity on the social networking service; and wherein ranking comprises ranking tags of discussion topics that have more than a number of members as being more relevant than tags of discussion topics that have more than the number of members.

18. The system of claim 16, wherein identifying the topic comprises:

completing the text to produce a query term; and searching the search index using the query term to identify the topic.

19. The system of claim 16, wherein the tags are displayed in a second display field; and wherein suggesting the ranked tags comprises:

substituting the first tag for the text in the first display field.

20. The system of claim 16, wherein performing the search comprises searching one or more social graphs to identify a social connection to the topic, and using the social connection to affect ranking of the tags.

* * * * *